(12) United States Patent
Ishikawa et al.

(10) Patent No.: US 7,681,680 B2
(45) Date of Patent: Mar. 23, 2010

(54) FRAME ASSEMBLY FOR A MOTORCYCLE

(75) Inventors: Yuzuru Ishikawa, Wako (JP);
Masayuki Taniguchi, Wako (JP); Kenji Hasegawa, Wako (JP); Shunichi Nakajima, Wako (JP); Koji Shimokawa, Wako (JP); Norio Hoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 706 days.

(21) Appl. No.: 11/366,213

(22) Filed: Mar. 2, 2006

(65) Prior Publication Data

US 2006/0197304 A1    Sep. 7, 2006

(30) Foreign Application Priority Data

Mar. 2, 2005    (JP) ............................. 2005-056986
Jul. 28, 2005   (JP) ............................. 2005-218770

(51) Int. Cl.
    *B62K 11/02*    (2006.01)
(52) U.S. Cl. ..................................... 180/219
(58) Field of Classification Search ................ 180/219, 180/228; 280/281.1
    See application file for complete search history.

(56) References Cited

U.S. PATENT DOCUMENTS

| | | | |
|---|---|---|---|
| 4,696,363 A | 9/1987 | Enda | |
| 5,022,456 A | 6/1991 | Kanzawa et al. | |
| 5,375,677 A | 12/1994 | Yamagiwa et al. | |
| 6,290,017 B1 * | 9/2001 | Ito | ............................. 180/227 |
| 6,502,658 B1 * | 1/2003 | Nagashii | ..................... 180/219 |
| 6,695,089 B2 * | 2/2004 | Adachi et al. | ............... 180/311 |

FOREIGN PATENT DOCUMENTS

| | | |
|---|---|---|
| DE | 438408 | 12/1926 |
| DE | 815908 | 10/1951 |
| JP | HEI 1-68293 | 5/1989 |
| JP | 03-186490 | 8/1991 |

* cited by examiner

*Primary Examiner*—Kevin Hurley
(74) *Attorney, Agent, or Firm*—Carrier, Blackman & Associates P.C.; William D. Blackman; Joseph P. Carrier

(57) ABSTRACT

A motorcycle body frame includes a main frame including a head pipe for supporting a front suspension at the front end thereof, a single leading frame portion extending rearwardly from the head pipe, and a rear frame portion for supporting a rear wheel suspension. The rear frame portion extends substantially downwardly from a rear part of the leading frame portion. The main frame, cast from an aluminum alloy, includes two component parts arranged front-to-rear. For example, a front frame portion is provided, and a rear frame portion is fixed to the rear side of the front frame portion. The leading frame portion has a small section portion, where the main frame is smallest in sectional area, disposed substantially centrally in the longitudinal direction thereof. The two component parts of the frame are joined at a coupling portion of the main frame situated in back of the small section portion.

17 Claims, 9 Drawing Sheets

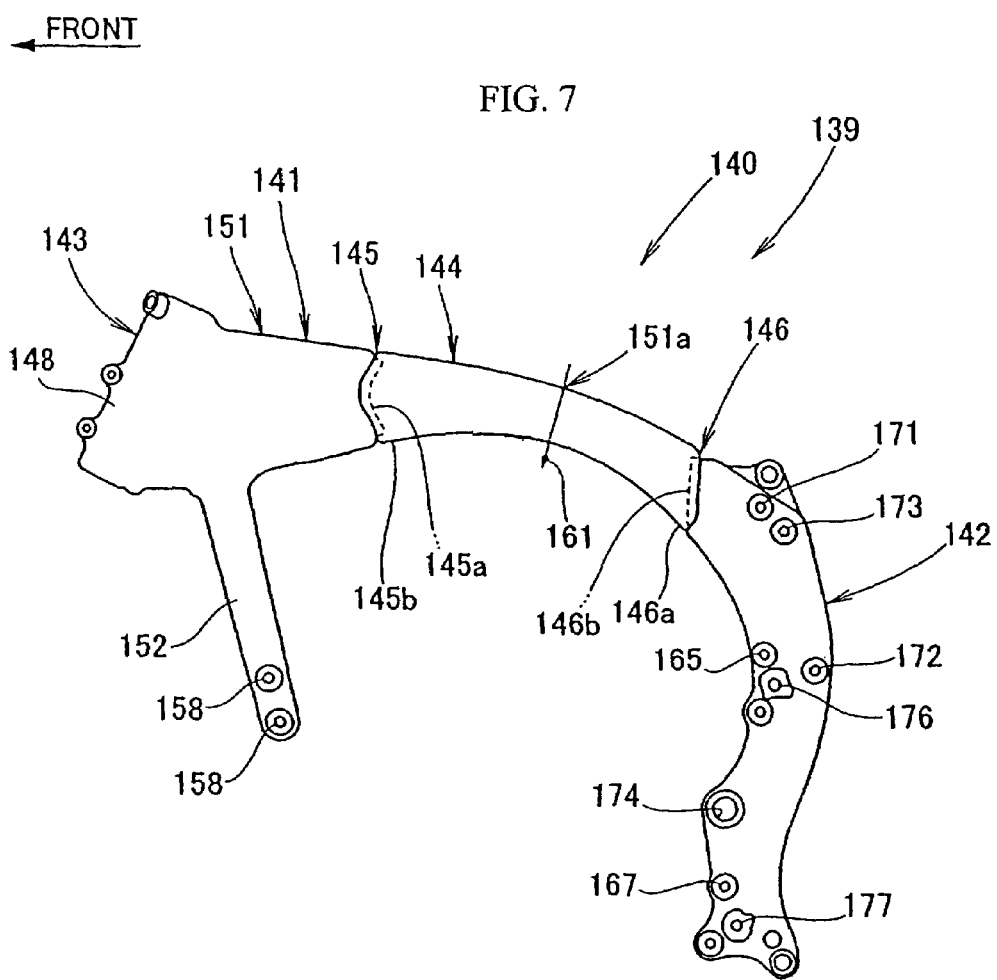

FRAME ASSEMBLY FOR A MOTORCYCLE

CROSS-REFERENCE TO RELATED APPLICATIONS

The present invention claims priority under 35 USC 119 based on Japanese patent applications No. 2005-056986, filed on Mar. 2, 2005, and No. 2005-218770 filed on Jul. 28, 2005. The subject matter of each of these priority documents is incorporated by reference herein.

BACKGROUND OF THE INVENTION

1. Field of the Invention

The present invention relates to an improvement in a frame assembly for a motorcycle.

2. Description of the Background Art

It is well known to form the frame assembly of a motorcycle by casting the frame from an aluminum alloy. It is also well known to provide a single leading frame portion of the motorcycle frame assembly which extends rearwardly from a head pipe. Such a frame assembly is disclosed, for example, in Japanese Utility Model Laid-open No. Hei 1-68293.

The following discussion refers to, and uses reference numbers from, the drawings of Japanese Utility Model Laid-open No. Hei 1-68293. As shown in FIGS. 1 and 3 of Japanese Utility Model Laid-open No. Hei 1-68293, a frame 10 is a member cast from an aluminum alloy, which is composed of a member 20 and a member 40 split to the left and the right, wherein respective front half portions 23 and 43 (for symbol 43, see FIG. 4) extending from the side of a head tube 21 are rectilinear, respective rear half portions 24 and 44 are dividedly extended to the outer sides and are angled rearwardly downward side from the rear ends of the front half portions 23 and 43, and the left and right front half portions 23 and 43 constitute a single main frame.

While the frame 10 is composed of the left and right two component parts, the structure, which is split to the left and the right, has the following problem: That is, left-right assembly error or errors are liable to be generated between the member 20 and the member 40. For example, it is difficult to accurately match the positions in the front-rear direction of left and right pivot portions 28 and 48 for supporting a rear swing arm 6 (see FIG. 1), or to accurately arrange the rear half portion 24 and the rear half portion 44 in left-right symmetry with respect to the center line extending in the front-rear direction of the frame 10. In addition, since the frame 10 is long in the front-rear direction, the length of weld that joins the member 20 and the member 40 to each other is large. As a result, the welding operation is lengthy so that manufacturing productivity is lowered.

It is an object of the present invention to provide an improved frame assembly for a motorcycle, in which the frame assembly is formed more accurately, and in which the manufacturing productivity of the frame assembly is enhanced.

SUMMARY

The present invention relates generally to improvements in motorcycle frame assemblies. A first aspect of the present invention relates to a frame assembly for a motorcycle. A frame assembly, according to the first aspect hereof, includes a head pipe for supporting a front wheel suspension at the front end thereof, a unitary main frame attached to and extending rearwardly from the head pipe, and a rear frame portion for supporting a rear wheel suspension. The rear frame portion extends substantially downwardly from a rear part of the main frame. Viewed from another perspective, the frame assembly includes a front component part and a rear component part, and both the front and rear component parts are cast from an aluminum alloy. The main frame is configured such that a portion thereof having the smallest sectional area is provided substantially centrally in the longitudinal direction of the main frame, and the front and rear component parts are coupled together at an area of the frame assembly in back of the smallest sectional area portion.

When the front and rear component parts of the frame assembly are dividedly distributed so that the front component part is located on the main frame side, and the rear component part is located on the rear frame portion side, it is possible to form the front component part as including the head pipe and the main frame integrated with each other, and to form the rear component part as a component part for supporting the rear wheel suspension. By doing so, errors are reduced in the left-right assembly accuracy of these component parts. In addition, it is possible to reduce the sectional area of the coupling portion between the front and rear two component parts, and, in the case of coupling the front and rear two component parts by welding, to reduce the length of the weld.

Further, while bending stress is increased at the smallest sectional area portion of the main frame, which is located at substantially the center in the longitudinal direction of the main frame, the arrangement of the coupling portion between the front and rear component parts of the frame assembly on the rear side of the smallest sectional area portion ensures that stress is not concentrated on the coupling portion, and that an excessively high stress is not generated.

A second aspect of the invention is characterized in that a front frame portion constituting a front portion of the main frame is formed as a hollow member, by placing a core within the mold for the front portion at the time of casting. In addition, a rear frame portion constituting a rear part of the main frame is cast by use of a left-right split die, so that recessed portions, opened in the leftward and rightward directions, and pivot support portions projecting in the leftward and rightward directions are integrally formed.

Since the front frame portion is formed to be hollow, a reduction in frame weight is achieved. Because the rear frame portion is provided integrally with the recessed portions opened in the leftward and rightward directions and the pivot support portions, the rear wheel suspension is formed in such a shape as to be supported easily, while achieving a reduction in weight.

A third aspect of the invention is provided in a frame assembly for a motorcycle including a head pipe for supporting a front wheel suspension at the front end thereof, a single main frame extended rearwardly from the head pipe, and a rear frame portion for supporting a rear wheel suspension. The rear frame portion extends substantially downwardly from a rear part of the main frame. The frame assembly is cast from an aluminum alloy, and includes three component parts arranged in the front-rear direction. The main frame is provided with a portion of the frame that is the smallest in sectional area. This small sectional area portion is disposed at substantially the center in the longitudinal direction of the main frame. In addition, the rear-side two component parts (for example, the main frame and the rear frame portion) of the three component parts are coupled at an area of the frame assembly behind the small sectional area portion.

Since the three component parts of the frame assembly are dividedly distributed in the front-to-rear direction of the vehicle so that the front-side two component parts (for example, the head pipe and the main frame) are located on the main frame side whereas the rear-side one component part (for example the rear frame portion) is located on the rear frame portion side, it is possible to form the front-side two component parts as component parts including the head pipe and the main frame, to form the rear-side one component part as a component part for supporting the rear wheel suspension, and to reduce an error or errors in the left-right assembly accuracy of these component parts. In addition, it is possible to reduce the sectional areas of the coupling portions among the three component portions which are distributed in the front-to-rear direction, and, in the case of connecting the three component portions by welding, to reduce the lengths of welds.

Further, while bending stress is increased at the smallest sectional area portion located at substantially the center in the longitudinal direction of the main frame, the arrangement of the coupling portion of the rear-side two component parts of the frame assembly so as to be on the rear side of the smallest sectional area ensures that stress is not concentrated on the coupling portion, and that an excessively high stress is not generated.

A fourth aspect of the invention is characterized in that the single main frame is bisected in the front-rear direction of the vehicle body. It is possible to reduce an error or errors in the left-right assembly accuracy of the main frame which is bisected in the front-rear direction. In addition, the respective members of the bisected main frame are easier to produce.

A fifth aspect of the invention is characterized in that split and welded portions of the frame assembly are provided respectively at a portion on the front side and at a portion on the rear side, relative to the position where the sectional area of the main frame is the smallest.

The split and welded portions of the frame assembly are provided respectively at a portion on the front side and at a portion on the rear side, while avoiding the position where the sectional area of the main frame is the smallest, whereby rigidity is prevented from being lowered at the split and welded portions of the frame assembly. In addition, since a large-type hollow casting can be obviated, it is easy to cast the main frame in a hollow form.

A sixth aspect of the invention is characterized in that an engine hanger portion provided in the frame assembly for supporting an engine is structurally separate member from the main frame. When the frame assembly is formed by gravity casting, a better flow of the molten metal in the engine hanger portion is achieved.

A seventh aspect of the invention is characterized in that the single main frame includes a hollow member which varies in sectional shape from one portion of the main frame to another portion. As a result, the rigidity of the main frame is varied from one portion to another portion, and a reduction in weight of the main frame is achieved.

According to the first aspect of the invention, the frame assembly is composed of two component parts, that is, the front and rear component parts, cast from an aluminum alloy. Therefore, when, for example the front and rear component parts of the frame assembly are dividedly distributed so that the front-side component part is located on the main frame side and the rear-side component part is located on the rear frame portion side, it is possible to form the front-side component part and the rear-side component part in structures suitable for the respective portions, to reduce an error or errors in the left-right assembly accuracy, and to form the frame assembly with high accuracy.

In addition, in the case of coupling the front and rear two component parts by welding, it is possible to reduce the length of the weld, to perform welding in a short time, to enhance manufacturing productivity, and to achieve a reduction in cost. Furthermore, since the front and rear two component parts are coupled on the rear side relative to the portion where the sectional area of the main frame is the smallest, stress concentration on the coupling portion between the front and rear two component parts is not liable to occur.

According to the second aspect of the invention, the front frame portion is formed to be hollow, whereby a reduction in vehicle frame weight can be achieved. In addition, since the rear frame portion is integrally formed with recessed portions which open in the leftward and rightward directions and with pivot support portions, it is possible to form the rear wheel suspension in such a shape as to be easy to support, while achieving a reduction in weight of the vehicle frame.

According to the third aspect of the invention, the frame assembly is cast from an aluminum alloy and is composed of three component parts arranged sequentially in the front-rear direction, so that when the three component parts of the frame assembly are dividedly distributed so that the two front-side component parts are located on the main frame side whereas the one rear-side component part is located on the rear frame portion side, the two front-side component parts and the one rear-side component part can be formed in structures suitable for the respective portions, the left-right assembly errors can be reduced, and the frame assembly can be formed with high accuracy. In addition, when connecting the three component parts by welding, it is possible to reduce the lengths of welds, to achieve the welding in a short time, and to enhance manufacturing productivity.

Further, since the two rear-side component parts of the three component parts of the frame assembly are coupled on the rear side of the vehicle frame relative to the portion where the sectional area of the main frame is the smallest, it is possible to ensure that a stress concentration is not liable to occur on the coupling portion between the two rear-side component parts, to further reduce the sectional area of the coupling portion, and to achieve a reduction in weight of the frame assembly.

According to the fourth aspect of the invention, the single main frame is bisected in the front-rear direction of the vehicle body, so that it is possible to reduce the left-right assembly errors of the main frame, and to form the main frame with high accuracy. In addition, the respective members of the split main frame are easier to produce, and manufacturing productivity is enhanced.

According to the fifth aspect of the invention, the split and welded portions of the frame assembly are provided respectively at a portion on the front side and at a portion on the rear side relative to the position where the sectional area of the main frame is the smallest, so that the split and welded portions are located so as to avoid the position where the sectional area of the main frame is the smallest. For example, the split and welded portions are located so as to avoid the portion where the frame rigidity is the lowest, whereby generation of an excessively high stress is obviated. In addition, since large-type hollow casting can be obviated, it is easy to achieve the hollow casting of the main frame.

According to a sixth aspect of the invention, the engine hanger portion is a structurally separate member from the main body of the frame, so that when the hanger portion is formed by gravity casting, the flow of the molten metal in the engine hanger portion is enhanced, and casting quality is enhanced.

According to the seventh aspect of the invention, the single main frame is composed of a hollow member varied in sectional shape from one portion of the main frame to another portion, so that the rigidity of the main frame can be varied from one portion to another portion, and the main frame can be reduced in weight.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 7 is a side plan view of a main frame according to a second embodiment of the present invention, showing the main frame including three component parts arranged sequentially in the front-to-rear direction of the vehicle.

DETAILED DESCRIPTION

Selected illustrative embodiments of the invention including a best mode will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. The drawings are to be looked at according to the posture of the reference symbols.

Figure 1:
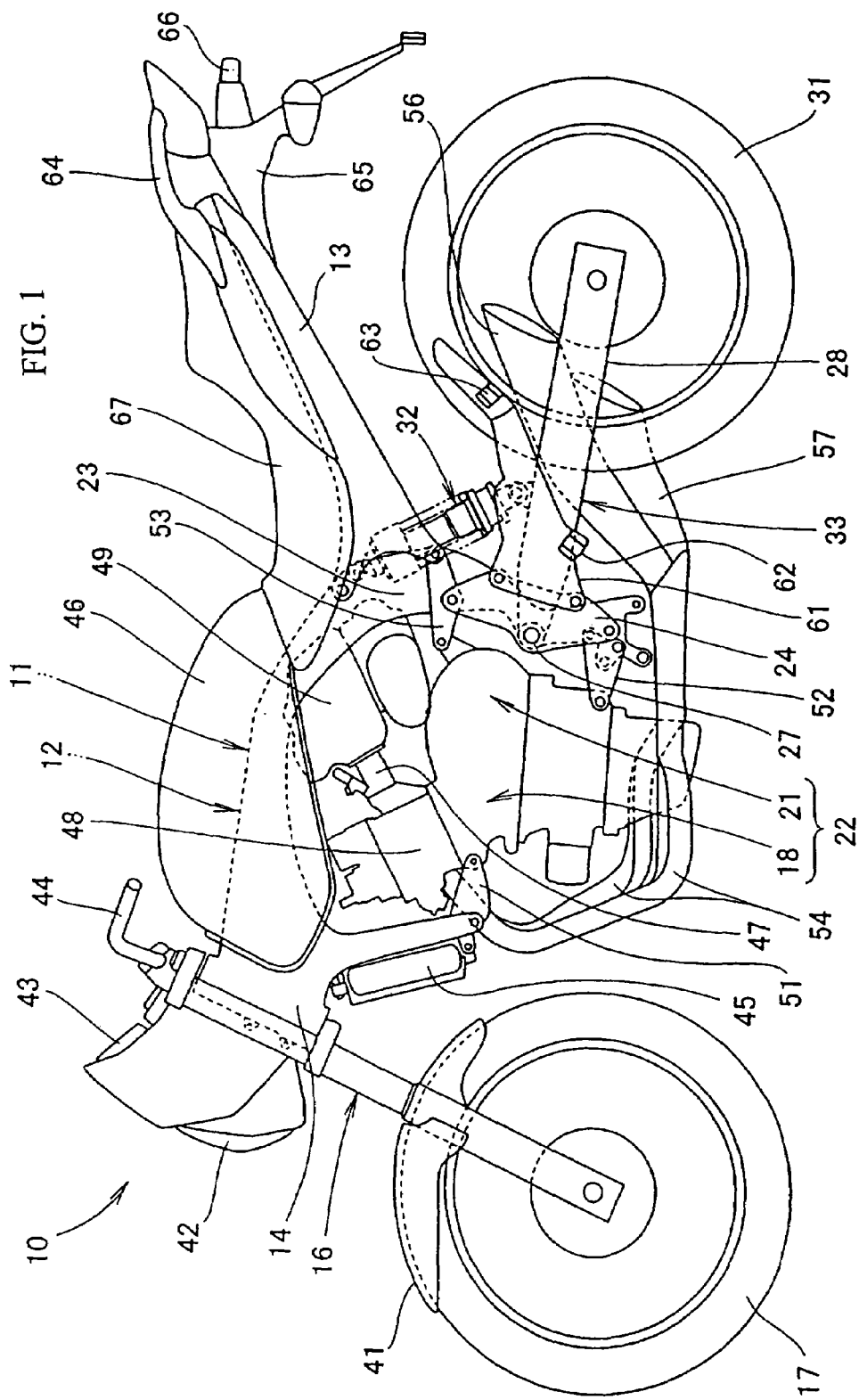
FIG. 1 is a side plan view of a motorcycle adopting a frame assembly according to a first embodiment of the present invention, showing the main frame including two component parts arranged sequentially in the front-to-rear direction of the vehicle.

FIG. 1 is a side plan view of a motorcycle adopting a frame assembly according to a first embodiment of the present invention. The motorcycle 10 has a structure in which the frame assembly 11 includes a main frame 12 on the front side of the vehicle, and a left-right pair of seat rails 13, 13 (only symbol 13 on the viewer's side is shown) that extend at an angle rearwardly upwardly from a rear upper portion of the main frame 12. A front fork 16 is steerably mounted to a head pipe 14 provided at a front end portion of the main frame 12, and a front wheel 17 is mounted to the lower end portions of the front fork 16.

A power unit 22, composed of an engine 18 and a transmission 21, is supported by a front lower portion and a rear lower portion of the main frame 12. A pivot shaft 27 is mounted to a rear frame portion 23 provided behind the main frame 12, and a left-right pair of brackets 24, 26 (only symbol 24 on the viewer's side is shown) is mounted to both lateral sides of the rear frame portion 23.

In addition, a swing arm 28 is vertically swingably mounted to the pivot shaft 27. A rear wheel 31 is mounted to a rear end portion of the swing arm 28, and a rear shock absorber unit 32 is provided extending between an upper portion of the swing arm 28 and a rear upper portion of the main frame 12. The swing arm 28 and the rear shock absorber unit 32 constitute a rear wheel suspension 33 for suspending the rear wheel 31.

The motorcycle 10 includes a front fender 41 covering the upper side of the front wheel 17, a head lamp 42, a meter 43, a steering handle 44, and a radiator 45. The motorcycle 10 includes a fuel tank 46 mounted to an upper portion of the main frame 12, a throttle body 47 mounted to a rear part of a cylinder head 48 of the engine 18, an air cleaner 49 connected to the throttle body 47, support brackets 51, 52 supporting the power unit 22 on the vehicle frame, and a rear support portion 53 provided in the rear frame portion 23 for supporting the power unit 22 on the rear frame portion 23. The motorcycle 10 further includes an exhaust pipe 54 which extends rearwardly from a front portion of the cylinder head 48 so as to pass on the lower side of the engine 18, and a first muffler 56 and a second muffler 57 are connected to the plurality of exhaust pipes 54 via a manifold.

In addition, the motorcycle 10 includes a left-right pair of step support stays 61, 61 (only symbol 61 on the viewer's side is shown) mounted respectively to the brackets 24 and 26, a left-right pair of driver's steps 62, 62 (only symbol 62 on the viewer's side is shown) mounted respectively to the step support stays 61, 61, and a left-right pair of passenger's steps 63, 63 (only symbol 63 on the viewer's side is shown) mounted respectively to the step support stays 61, 61. The motorcycle 10 includes a grab rail 64, a rear fender 65 covering the upper side of the rear wheel 31, a tail lamp 66, and a seat 67 mounted to the seat rails 13, 13.

First Embodiment

Figure 2:
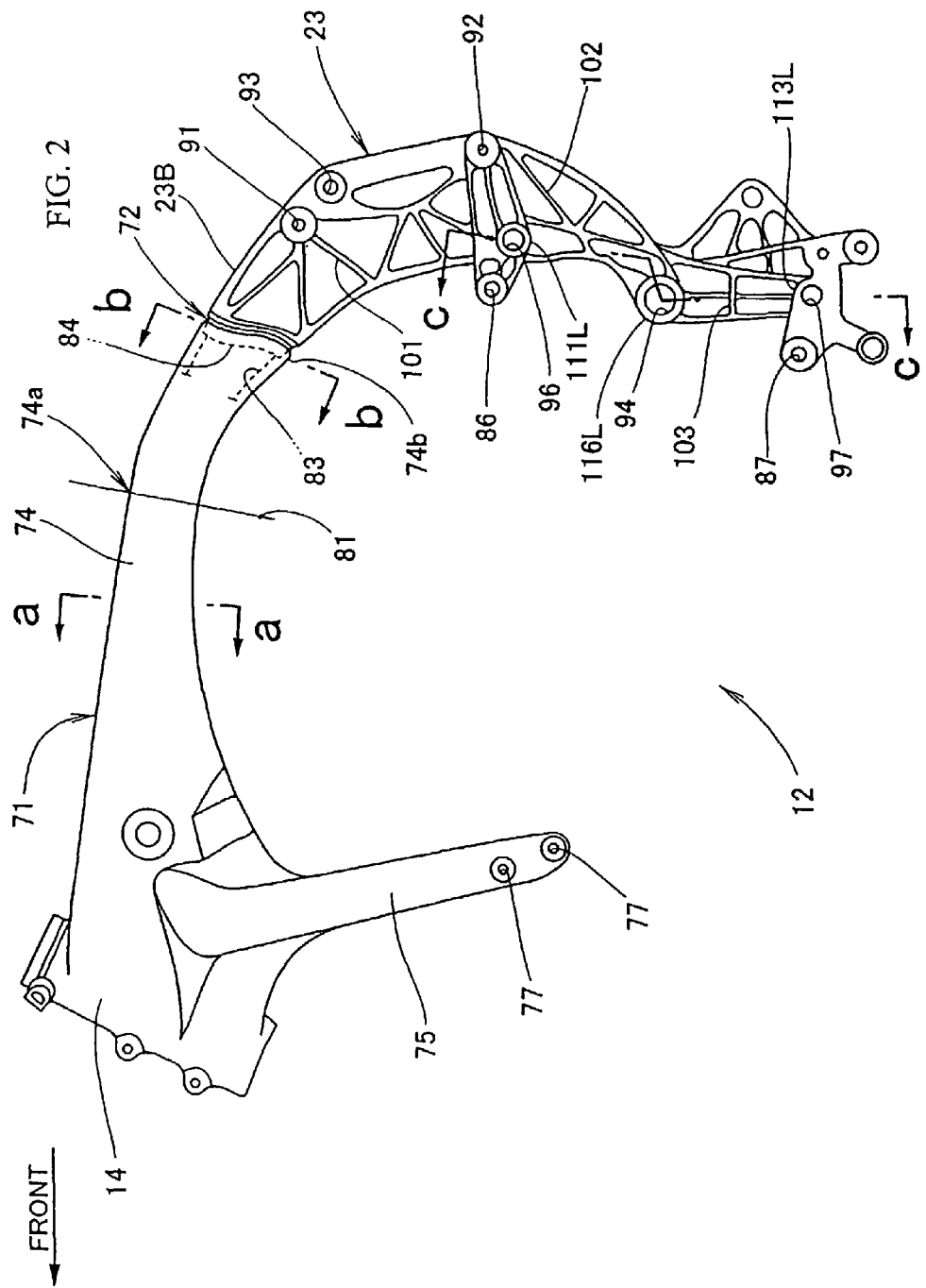
FIG. 2 is a side plan view of an isolated main frame according to a first embodiment of the present invention, where the main frame of FIG. 2 is a component part of the motorcycle of FIG. 1.

FIG. 2 is an isolated side plan view (the arrow labeled "FRONT" in the figure indicates the direction corresponding to the front side of the vehicle) of a main frame according to the first embodiment of the present invention. The main frame 12 of FIG. 2 is cast from an aluminum alloy, and includes two primary component parts arranged serially in the front-to-rear direction of the vehicle. Specifically, the main frame 12 includes a front component part and a rear component part, namely, a front frame portion 71 on the front side, and the rear frame portion 23 connected to the rear end of the front frame portion 71 by welding. In the Figures, symbol 72 denotes a welded coupling portion between the front frame portion 71 and the rear frame portion 23.

The front frame portion 71 is a member that is formed so as to be hollow by placing a core within the mold for the front frame portion 71 at the time of casting. The front frame portion 71 integrally includes the head pipe 14, a single unitary leading frame portion 74 that extends rearwardly from the head pipe 14, and a left-right pair of front engine support arms 75 and 76, that extend downwardly angled sideways and downwardly angled rearwardly from a front lower portion of the leading frame portion 74 (only symbol 75 on the viewer's side is shown). The front engine support arms 75, 76 support a front portion of the engine 18 (see FIG. 1) by means of engine support holes 77, 77 disposed at the tip end portions of the front engine support arms 75, 76.

The leading frame portion 74 includes a small section portion 74a (a straight line passing through the small section portion 74a is denoted by 81 in FIG. 2). The small section portion 74a is the portion of the leading frame portion 74 that is the smallest in cross sectional area, and is provided at a rear part of the front frame portion 71. The cross sectional area of a front-side coupling portion 74b (i.e., the sectional area of the coupling portion 72), disposed rearward of the small section portion 74a, is set to be greater than the cross sectional area of the small section portion 74a.

During operation of the vehicle, a compressive force, tending to deform the main frame 12, is exerted on the main frame 12 from the head pipe 14 through the front wheel and the front fork, or from the rear frame portion 23 through the rear wheel, the swing arm and the pivot shaft.

For example, at the time of braking the vehicle, a rearward force acts on the head pipe 14 from the front wheel side, whereby the main frame 12 as a whole is deformed, so as to shorten the distance between a front wheel axle and a rear wheel axle, namely, the wheel base. In addition, at the time of accelerating the vehicle by opening the throttle, a forward force is exerted on the rear frame portion 23 due to the drive force of the rear wheel, whereby the main frame 12 as a whole is deformed so as to shorten the wheel base.

In the above cases, a large stress is generated in the small section portion 74a of the main frame 12. However, since the coupling portion 72 is larger in cross sectional area than the small section portion 74a, the stress generated in the coupling portion 72 is smaller than the stress generated in the small section portion 74a.

The coupling portion 72 is provided in back of the small section portion 74a for the following reasons. First, the maximum input from the head pipe 14 side (for example, an input at the time of full braking) is greater than the maximum input from the rear frame portion 23 side, so that an excessively high stress would be generated in the coupling portion 72 if the coupling portion 72 were to be provided in front of the small section portion 74a. Second, the coupling portion 72 is located at a position where splitting the main frame 12 into the front frame portion body 71 and the rear frame portion body 23, each supporting the portions of the vehicle body, can be easily achieved.

Figure 4A:
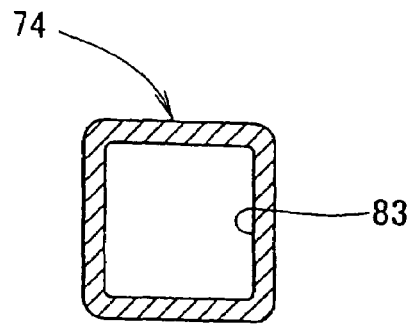
FIG. 4A is a sectional view of the main frame across line a-a of FIG. 2 showing the cross sectional shape of the main frame at a location between the head pipe and an area of the main frame where the sectional area thereof is the smallest.
Figure 4B:
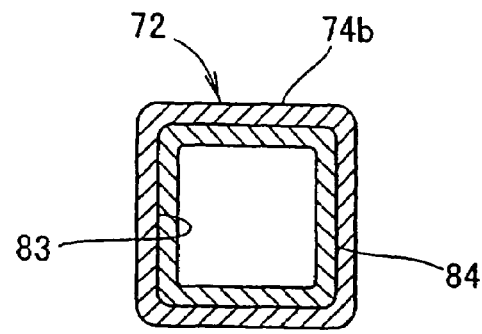
FIG. 4B is a sectional view of the main frame across line b-b of FIG. 2 showing the cross sectional shape of the main frame at a location corresponding to the coupling between the front frame portion and rear frame portion.

The rear frame portion 23 includes a rear-side coupling portion 84 (see FIGS. 2, 4B). The coupling portion 84 projects forward from the front end of the rear frame portion 23 so as to be slidably fitted inside of a hollow portion 83 of a front-side coupling portion 74b of the front frame portion 71.

The rear frame portion 23 also includes a left-right pair of upper power unit mount holes 86, 86 (only symbol 86 on the viewer's side is shown) and a left-right pair of lower power unit mount holes 87, 87 (only symbol 87 on the viewer's side is shown) for mounting a rear part of the power unit 22 to the rear frame portion (see FIG. 1).

The rear frame portion 23 also includes pairs of upper seat rail mount holes 91, 91 (only symbol 91 on the viewer's side is shown) and lower seat rail mount holes 92, 92 (only symbol 92 on the viewer's side is shown), which are provided for mounting the seat rails 13, 13 thereon (see FIG. 1). A left-right pair of shock absorber upper portion mount holes 93, 93 (only symbol 93 on the viewer's side is shown) for mounting one end of the rear shock absorber unit 32 (see FIG. 1) and a pivot insertion hole 94 in which to insert the pivot shaft 27 (see FIG. 1) are also provided on the rear frame portion 23. The rear frame portion also has left-right pairs of upper bracket mount holes 96, 96 (only symbol 96 on the viewer's side is shown) and lower bracket mount holes 97, 97 (only symbol 97 on the viewer's side is shown) formed therein, for use in mounting the brackets 24 and 26 (see FIG. 1) on to the rear frame portion 23. In addition, a plurality of ribs, for example, left-right pairs of ribs 101 to 103 (only symbols 101 to 103 on the viewer's side are shown) are provided on side surfaces of the rear frame portion 23.

Figure 3:
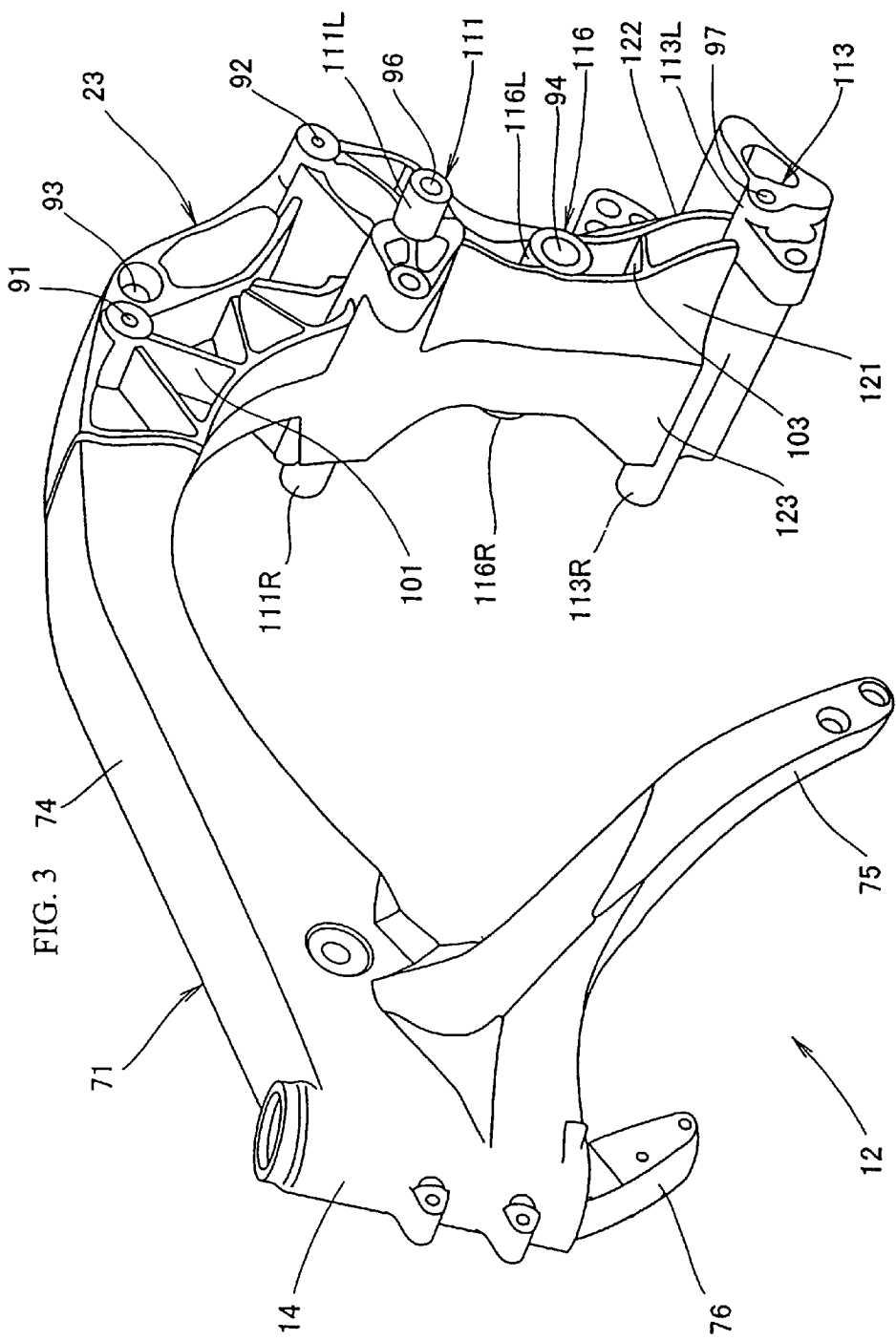
FIG. 3 is a perspective view of the main frame of FIG. 2.

FIG. 3 is a perspective view of the main frame 12 according to the first embodiment of the present invention, showing the rear frame portion 23, integrally formed by casting, coupled to the leading frame portion 74 of the front frame portion 71, also integrally formed by casting. As previously noted, in this first embodiment of the main frame 12, the front and rear frame portions 71, 23 are welded together.

The single, unitary leading frame portion 74 extends substantially rectilinearly toward the rear side of the vehicle, as shown, and the front engine support arms 75 and 76, which constitute the engine hanger, extend substantially downwardly from the leading frame portion 74 toward the left and right sides thereof. The leading frame portion 74 and the front engine support arms 75 and 76 are both hollow members.

On the rear frame portion 23, an upper bracket mount portion 111 (composed of a left-right pair including a left upper mount portion 111L and a right upper mount portion 111R) is provided with an upper bracket mount hole 96. A lower bracket mount portion 113 (composed of a left-right pair including a left lower mount portion 113L and a right lower mount portion 113R) is provided with a lower bracket mount hole 97. The upper bracket mount portion 111 and the lower bracket mount portion 113 extend sideways relative to the front-to-rear direction of the vehicle, and project outwardly relative to a pivot support sleeve 116. The pivot support sleeve 116 is composed of a left-right pair including a left pivot support sleeve 116L and a right pivot support sleeve 116R, and is provided with a pivot insertion hole 94 formed therein. The pivot support sleeve 116 is disposed between the upper bracket mount portion 111 and the lower bracket mount portion 113 when viewed in the front-to-rear direction of the vehicle.

In FIG. 3, symbols 121 and 122 denote left reinforcing walls for connecting the left upper mount portion 111L, the left pivot support sleeve 116L and the left lower mount portion 113L. Symbols 123 and 124 (only symbol 123 is shown) denote corresponding right reinforcing walls for connecting the right upper mount portion 111R, the right pivot support sleeve 116R and the right lower mount portion 113R.

Figure 4C:
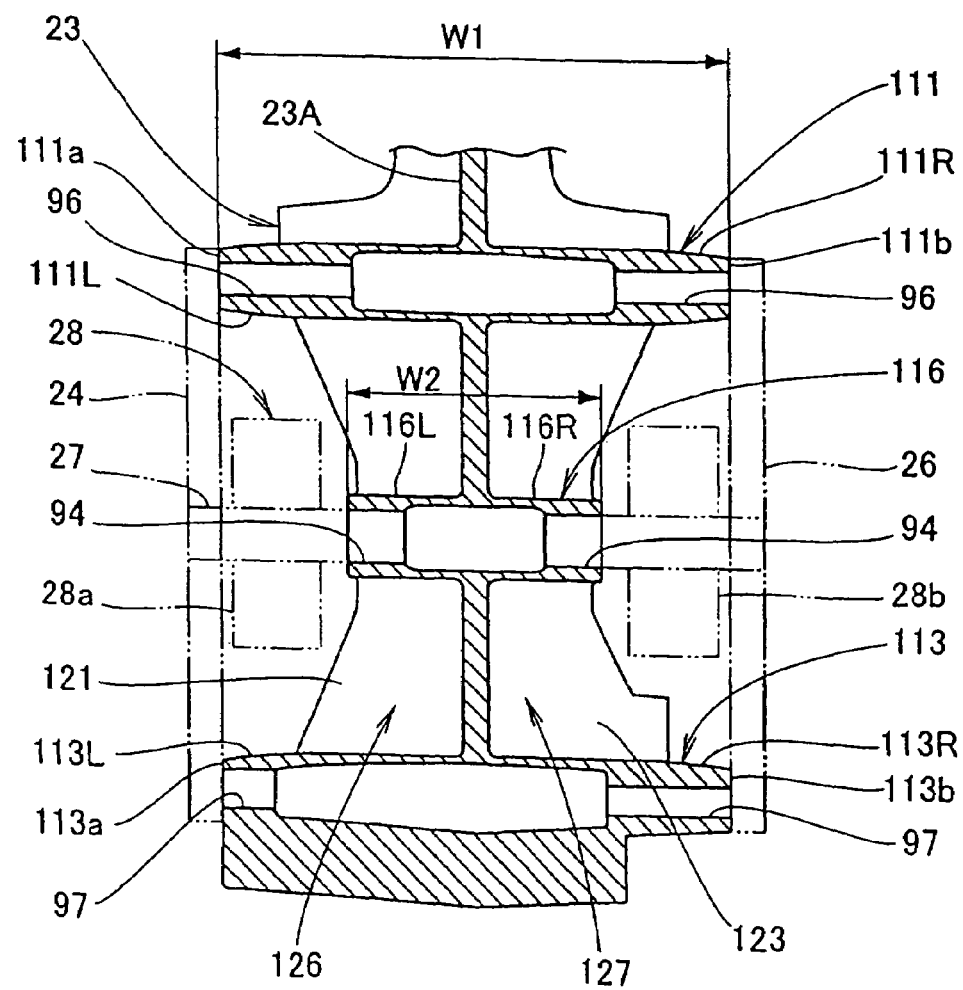
FIG. 4C is a sectional view of the main frame across line c-c of FIG. 2 showing a sectional view of the rear frame portion at a location corresponding to the mounting structure for the motorcycle swing arm.

FIGS. 4(a) to 4(c) are sectional views of selected portions of the main frame according to the first embodiment hereof.

FIG. 4(a) is a sectional view taken along line a-a of FIG. 2, and shows that the leading frame portion portion 74 is formed to be angular pipe-like, for example, a closed rectangular tube, in section.

FIG. 4(b) is a sectional view taken along line b-b of FIG. 2, in which the coupling portion 72 between the front frame portion and the rear frame portion is shown, including the angular pipe-like rear-side coupling portion 84 fitted inside of the angular pipe-like front-side coupling portion 74b.

FIG. 4(c) is a sectional view taken along line c-c of FIG. 2, and shows that the rear frame portion 23 is provided with a vertical wall 23A extending vertically over substantially the whole range of a central portion thereof. The left upper mount portion 111L, the right upper mount portion 111R, the left pivot support sleeve 116L, the right pivot support sleeve 116R, the left lower mount portion 113L, and the right lower mount portion 113R are each extended respectively leftward or rightward from the vertical wall 23A. The width W1 of the upper bracket mount portion 111 and the lower bracket mount portion 113 is set to be greater than the width W2 of the pivot support sleeve 116.

The left arm portion 28a and the right arm portion 28b of the swing arm 28 are disposed between the brackets 24, 26 and the pivot support sleeve 116. The brackets 24, 26 are mounted to end faces (an upper-side left end face 111a, an upper-side right end face 111b, a lower-side left end face 113a, and a lower-side right end face 113b) of the upper bracket mount portion 111 and the lower bracket mount portion 113. In addition, the pivot shaft 27 passes through the bracket 24, the left swing arm portion 28a, the pivot support sleeve 116, the right swing arm portion 28b, and the bracket 26, whereby the swing arm 28 is swingably supported by the pivot support sleeve 116 and the brackets 24, 26 through the pivot shaft 27.

As seen in FIG. 4C, the left reinforcing walls 121, 122 (only the left reinforcing wall 121 is shown) and the right reinforcing walls 123, 124 (only the right reinforcing wall 123 is shown) are gradually enlarged in width from the pivot support sleeve 116 side toward the upper bracket mount portion 111 side, and are gradually enlarged in width from the pivot support sleeve 116 side toward the lower bracket mount portion 113 side, whereby the upper bracket mount portion 111 and the lower bracket mount portion 113 are reinforced. In this figure, recessed portions 126, 127 are formed on the vehicle lateral sides relative to the vertical wall 23A and between the upper bracket mount portion 111 and the lower bracket mount portion 113.

Thus, the rear frame portion 23 includes the recessed portions 126 and 127 opened in the leftward and rightward directions and the pivot support sleeves 116 projecting in the leftward and rightward directions, which are integrally formed.

Figure 5:
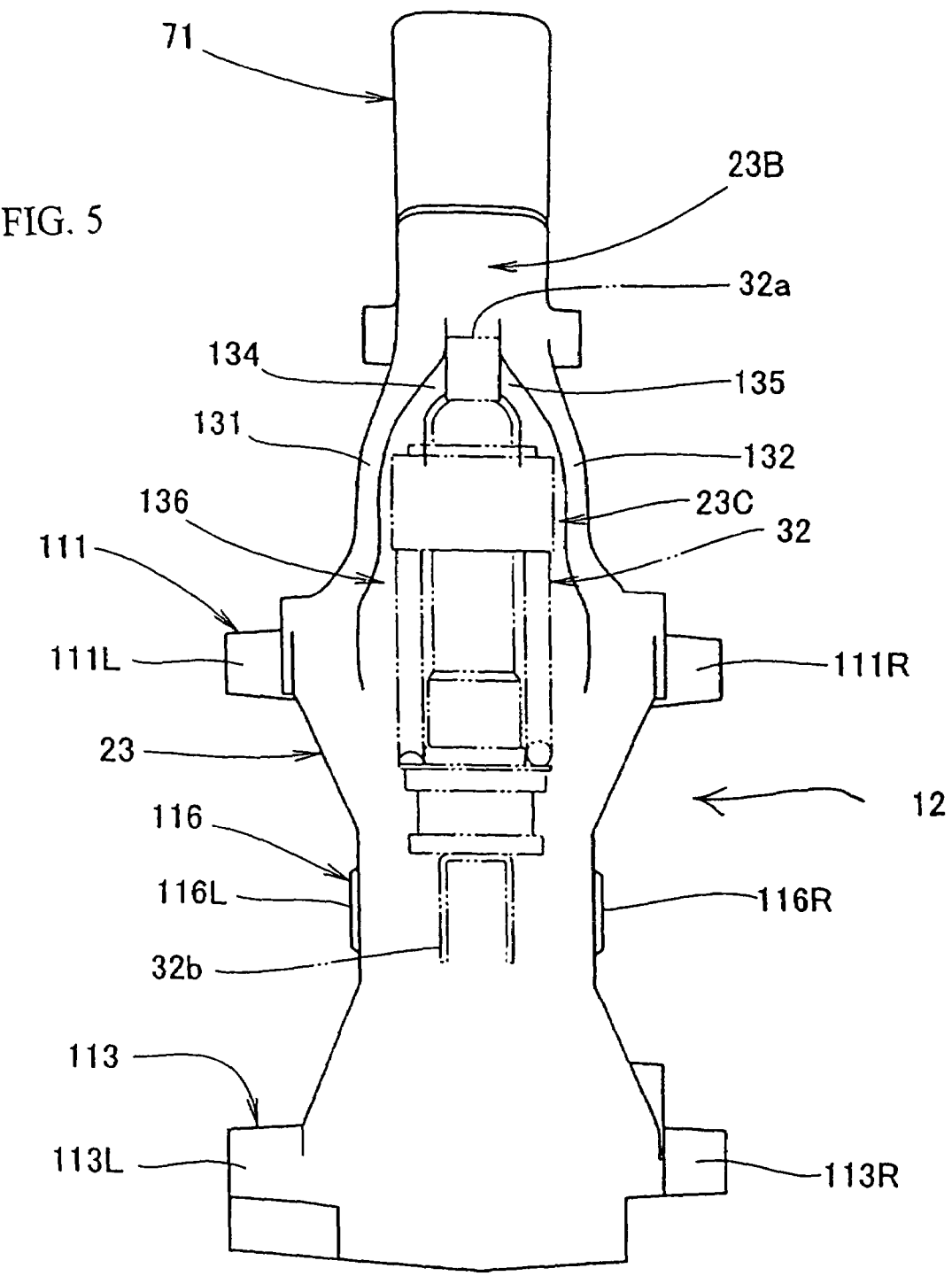
FIG. 5 is a rear plan view of the rear frame portion, showing a shock absorber (in phantom) secured to a shock absorber mount and disposed in a space between outwardly extending wall portions.

FIG. 5 is a rear plan view of the main frame 12 according to the first embodiment of the present invention. The rear frame portion 23 has a rear wall 23B provided with rising walls 131 and 132. Rising walls 131, 132 are project integrally rearwardly from respective left and right edge portions of the rear wall 23B, for covering the left and right portions of the rear shock absorber unit 32. Upper shock mount portions 134, 135 (see FIG. 2) are respectively provided with upper shock mounting holes 93 (see FIG. 2) for mounting an upper end portion 32a of the rear shock absorber unit 32. A space 136 is provided for containing a part of the rear shock absorber unit 32 between the left and right rising walls 131 and 132, and a lower end portion 32b is provided for mounting the rear shock absorber unit 32 to the swing arm 28 (see FIG. 1).

Figure 6:
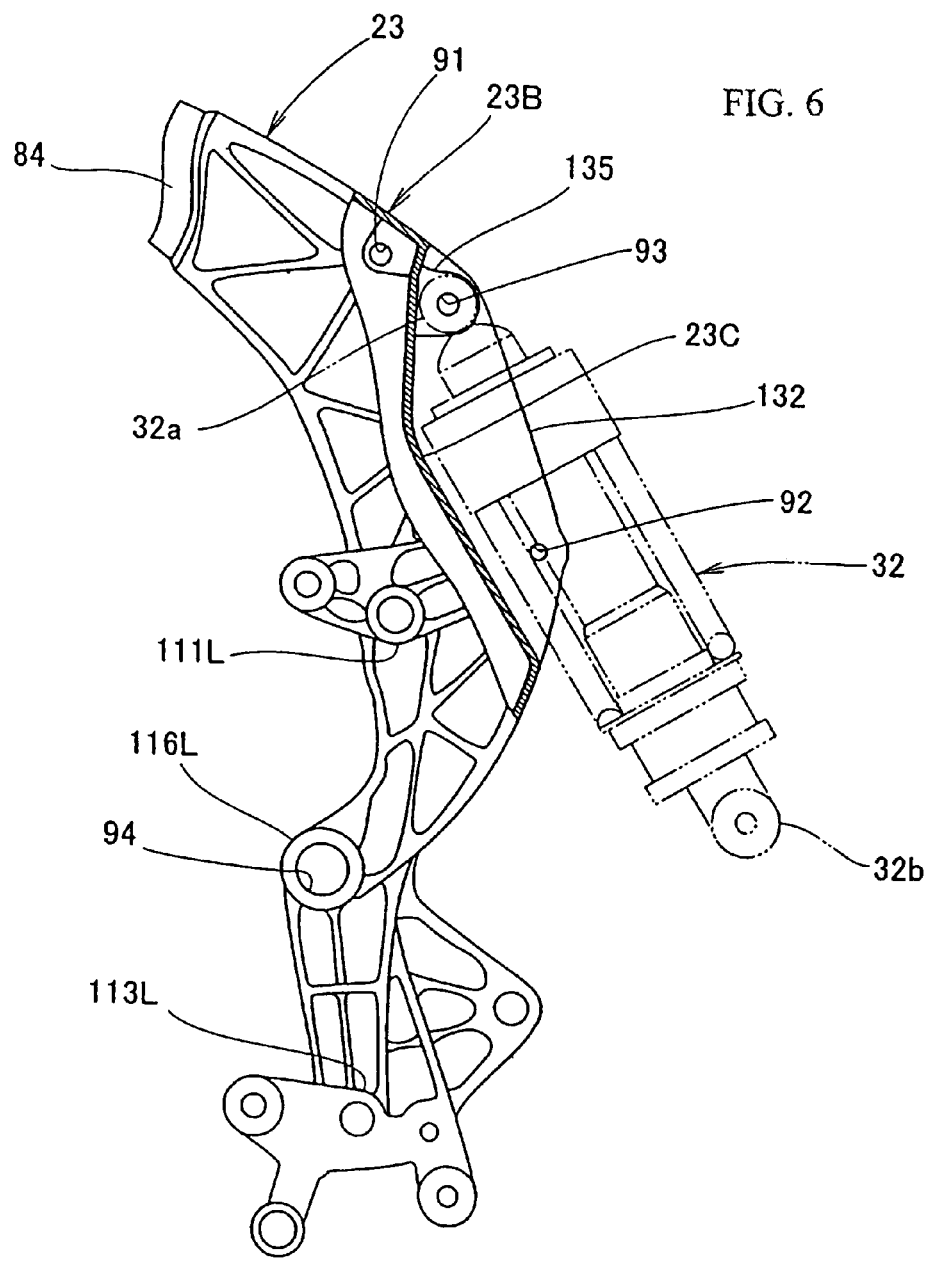
FIG. 6 is a partial side sectional view of the rear frame portion of FIG. 5, showing a rear shock absorber (in phantom) mounted to the rear frame portion according to the present invention.

FIG. 6 is a sectional view (partly a side plan view) showing a rear shock absorber unit 32 mounted to the rear frame portion according to the first embodiment of the present invention. A rear bottom wall 23C, located between the rising walls 131 and 132 (only the rising wall 132 on the depth side is shown) and constituting a part of the rear wall 23B, is a portion provided substantially along the rear shock absorber unit 32. In addition, the upper shock mount portions 134 and 135 (only the upper shock mount portion 135 is shown) are portions of the rear frame portion 23 projected from the rear bottom wall 23C and the rising walls 131 and 132.

The rising walls 131 and 132 are formed by casting, whereby they can be easily formed and it is possible to reduce cost and enhance manufacturing productivity, as compared with the case where the rising walls, as separate members, are mounted by welding. In addition, the rising walls 131 and 132 also function as reinforcing ribs, so that the strength and rigidity of the rear frame portion 23 can be easily enhanced, as compared with the case where reinforcing members are mounted as separate members.

As shown in FIGS. 1 and 2 above, the first embodiment of the present invention is characterized as follows: The frame assembly 11 for the motorcycle 10 includes the head pipe 14 for supporting the front fork 16 as a front wheel suspension at the front end thereof. The frame assembly 11 also includes the leading frame portion 74 as a single unitary main frame section extended rearwardly from the head pipe 14, and the rear frame portion 23 for supporting the rear wheel suspension 33. The rear frame portion 23 extends substantially downwardly from a rear part of the leading frame portion 74. That is, the main frame 12, constituting the frame assembly 11, is composed of two, front and rear, component parts, i.e., the front frame portion 71 on the front side of the vehicle, and the rear frame portion 23 on the rear side of the front frame portion 71. The two component parts are cast from an aluminum alloy. The leading frame portion 74 is provided with the small section portion 74a, defined as the portion being the smallest in sectional area, disposed substantially centrally in the longitudinal direction leading frame portion 74, and the two component parts 71, 23 are coupled together, front to rear, at a portion of the main frame in back of the small section portion 74a.

The main frame 12 is cast from an aluminum alloy, and includes both the front frame portion 71 and the rear frame portion 23 as component parts thereof. Therefore, when the front-side component part of the two component parts of the main frame 12 is distributed on the front frame portion 71 side and the rear-side component part is distributed on the rear frame portion 23 side, the front frame portion 71 and the rear frame portion 23 can be formed in such structures as to be suitable for the respective positions, an error or errors in assembly on the left and right sides can be reduced, and the main frame 12 can be formed with good accuracy.

In addition, where the front frame portion 71 and the rear frame portion 23 are coupled by welding, the length of the weld can be reduced, the welding can be carried out in a short time, and manufacturing productivity can be enhanced.

Further, since the front frame portion 71 and the rear frame portion 23 are joined together at a portion of the main frame 12 in back of the small section area 74a of the leading frame portion 74, it is possible to ensure that stress is not liable to be concentrated on the coupling portion 72 between the front frame portion 71 and the rear frame portion 23. In addition, the sectional area of the coupling portion 72 can be further reduced, and it is possible to achieve a reduction in the weight of the main frame 12 and, hence, of the frame assembly 11.

The first embodiment of the present invention is secondly characterized in that, as shown in FIG. 2 and FIGS. 4(a) to 4(c), the front frame portion 71, constituting a front portion of the main frame 12, is formed to be hollow by placing a core within the mold at the time of casting. Additionally, the rear frame portion 23, constituting a rear part of the main frame 12, is cast by use of a left-right split die, whereby the recessed portions 126 and 127 opened in the leftward and rightward directions and the pivot support sleeves 116 projecting in the leftward and rightward directions are integrally formed in the rear frame portion 23.

With the front frame portion 71 formed to be hollow, a reduction in overall frame weight can be achieved. In addition, since the rear frame portion 23 is integrally formed with the recessed portions 126 and 127, opened in the leftward and rightward directions, and the pivot support sleeves 116, the rear wheel suspension 33 (see FIG. 1) can be easily supported by the pivot support sleeves 116 while achieving a reduction in weight.

Second Embodiment

FIG. 7 is a side view of a main frame 140 according to a second embodiment of the present invention. The main frame 140 of a frame assembly 139 is a member cast from an aluminum alloy and composed of a front frame portion 141, for placement on the front side of the vehicle, and a rear frame portion 142 welded to the rear end of the front frame portion 141.

The front frame portion 141 is a member formed to be hollow by placing a core within the mold at the time of casting, and is composed of two component parts, i.e., a front half portion 143 and a rear half portion 144 welded to the rear end of the front half portion 143. Incidentally, in FIG. 7, symbol 145 denotes a first coupling portion between the front half portion 143 and the rear half portion 144, and symbol 146 denotes a second coupling portion between the rear half portion 144 and the rear frame portion 142. Thus, the main frame 140 is trisected in the front-rear direction.

In addition, the front half portion 143 of the front frame portion 141 is composed of a head pipe 148, a single leading frame portion 151 extended substantially rectilinearly rearwardly from the head pipe 148, and a left-right pair of front engine support portions 152 and 153 (only symbol 152 on the viewer's side is shown). The left-right pair of front engine support portions 152 and 153 extend angled downwardly sideways and angled downwardly rearwardly from a front lower portion of the main frame 151, for supporting a front portion of an engine 18 (see FIG. 1).

The front frame portion 141 is composed of a front half portion 143, and a rear half portion 144 welded to the rear end of the front half portion 143. Namely, the front frame portion 141 is bisected in the front-rear direction. Both the front half portion 143 and the rear half portion 144 are angular pipe-like members, for example closed rectangular, in section. In addition, engine support holes 158, 158 are provided respectively in tip end portions of the front engine support portions 152 and 153, for supporting a front portion of the engine 18 (see FIG. 1).

Thus, the front frame portion 141 is split into the front half portion 143 and the rear half portion 144, whereby the front half portion 143 and the rear half portion 144 can be formed in small shapes. As a result, they can be cast easily, flow of molten metal at the time of casting can be made favorable, and casting quality can be enhanced.

The front frame portion 141 includes a small section portion 151a corresponding to the portion of the frame which is the smallest in sectional area. The small section portion 151a is disposed at substantially the center of the rear frame portion 156. In FIG. 7, a straight line passing through the small section portion 151a is denoted by 161. The sectional areas of the first coupling portion 145 and the second coupling portion 146 are set to be greater than the sectional area of the small section portion 151a, and the sectional area of the first coupling portion 145 is set to be greater than the sectional area of the second coupling portion 146.

The first coupling portion 145 includes a first front-side coupling portion 145a. The first front-side coupling portion 145a is provided at the rear end of the leading frame portion 151 and projects rearwardly therefrom. A first rear-side coupling portion 145b is a recessed portion, provided at the front end of the rear half portion 144, which receives the first front-side coupling portion 145a therein.

The second coupling portion 146 includes a second front-side coupling portion 146a. The second front-side coupling portion 146a is a recessed portion provided at the rear end of the rear half portion 144. A second rear-side coupling portion 146b, which is a projection provided extending forwardly at the front end of the rear frame portion 142, is received within the second front-side coupling portion 146a.

The second coupling portion 146 is provided on the main frame 140 in back of the small section portion 151a, because the maximum input from the rear frame portion 142 side is smaller than the maximum input from the head pipe 148 side. The first coupling portion 145 is provided on the front side of the main frame 140 relative to the small section portion 151a because, even when a greater input is exerted on the first coupling portion 145 than on the second coupling portion 146, the configuration in which the sectional area of the first coupling portion 145 is greater than the sectional area of the second coupling portion 146 ensures that the bending stress at the first coupling portion 145 can be reduced to be comparable to that at the second coupling portion 146. In addition, this is because the second coupling portion 146 is located at a position where splitting the main frame 140 into the front frame portion 141 and the rear frame portion 142, supporting the portions of the vehicle body, can be easily achieved.

The rear frame portion 142 includes a left-right pair of power unit mount holes 165, 165 (only symbol 165 on the viewer's side is shown) and a left-right pair of power unit mount holes 167, 167 (only symbol 167 on the viewer's side is shown) for mounting a rear part of the power unit 22 (see FIG. 1). The rear frame portion 142 also includes seat rail mount holes 171, 171 (only symbol 171 on the viewer's side is shown) and seat rail mount holes 172, 172 (only symbol 172 on the viewer's side is shown) for mounting the seat rails 13, 13 (see FIG. 1). A left-right pair of shock absorber upper portion mount holes 173, 173 (only symbol 173 on the viewer's side is shown) for mounting one end of the rear shock absorber unit 32 (see FIG. 1), a pivot insertion hole 174 for inserting the pivot shaft 27 (see FIG. 1) therein, and left-right pairs of bracket mount holes 176, 176 (only symbol 176 on the viewer's side is shown) and bracket mount holes 177, 177 (only symbol 177 on the viewer's side is shown) for mounting the brackets 24 and 26 (see FIG. 1) are also provided. The rear frame portion 142 is cast by use of a left-right split die.

Third Embodiment

Figure 8A:
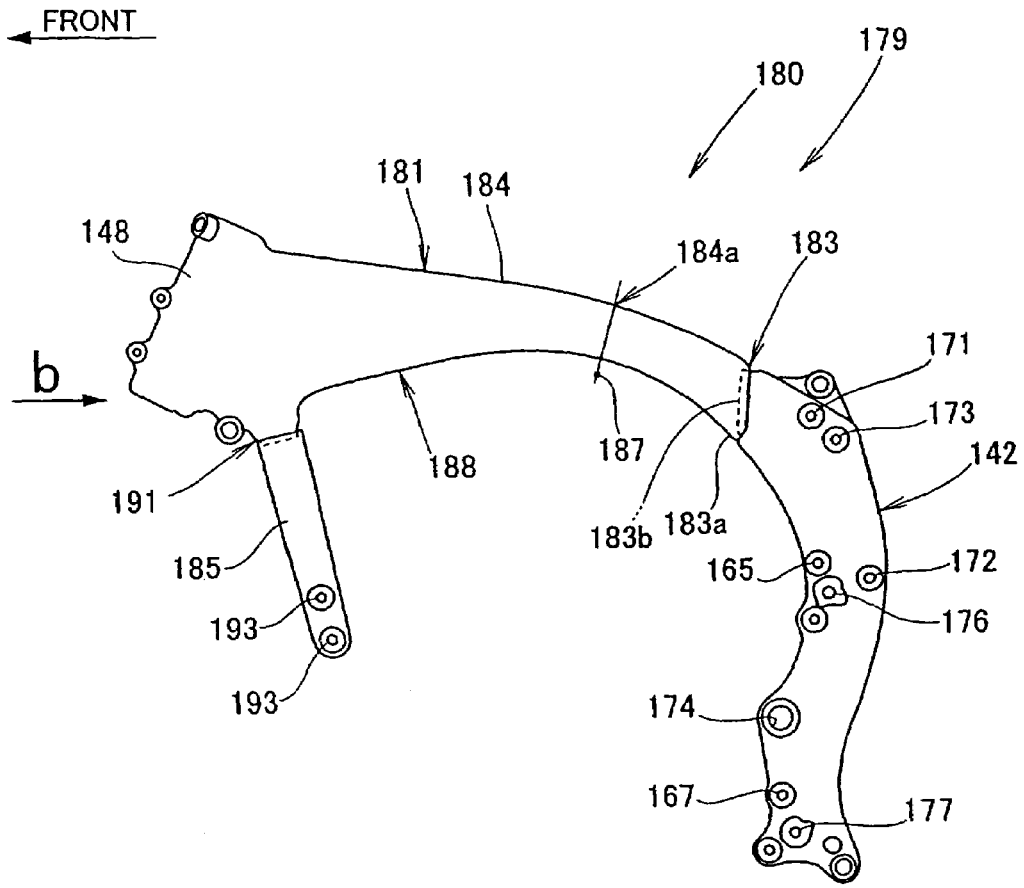
FIG. 8A is a side plan view of a main frame according to a third embodiment of the present invention, showing the main frame including three component parts, a main frame, a rear frame portion and engine support portion, wherein the engine support portions are separable from the main frame.
Figure 8B:
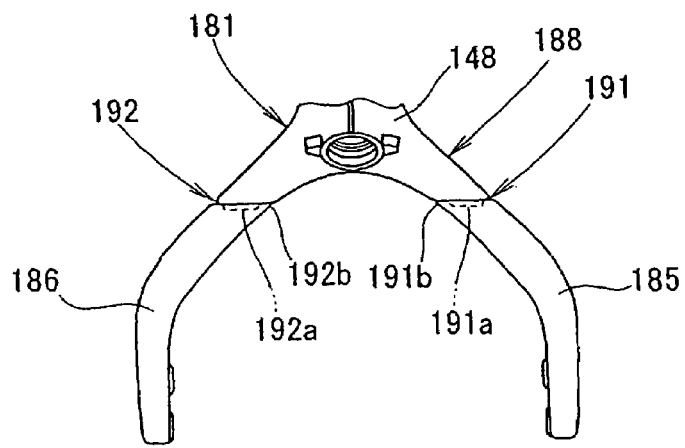
FIG. 8B is a front elevational view of the main frame of FIG. 8A, showing the configuration of the engine support portion with respect to the main frame.

FIGS. 8(a) and 8(b) are side views of a main frame 180 according to a third embodiment of the present invention. In FIGS. 8(a) and 8(b), the same components as those in the second embodiment shown in FIG. 7, where unchanged from the second embodiment, are denoted by the same symbols as used above, and detailed description thereof is omitted.

In FIG. 8(a), a main frame 180, constituting a frame assembly 179, is cast from an aluminum alloy. The main frame 180 is composed of a front frame portion 181 on the front side of the vehicle, and a rear frame portion 142 welded to the rear end of the front frame portion 181. Incidentally, denotes a welded coupling portion 183 is provided between the front frame portion 181 and the rear frame portion 142. The coupling portion 183 includes a front-side coupling portion 183a. The front-side coupling portion 183a is a recessed portion provided at the rear end of the front frame portion 181. The coupling portion 183 also includes a rear-side coupling portion 183b, which is a forwardly extending projection provided on the front end rear frame portion 142 side and which is received within the front-side coupling portion 183a.

The front frame portion 181 is a member formed to be hollow by placing a core within the mold at the time of casting. The front frame portion 181 is composed of a head pipe 148, a leading frame portion 184 extended substantially rectilinearly rearwardly from the head pipe 148, and a left-right pair of front support portions 185 and 186 (only symbol 185 on the viewer's side is shown) welded to a front lower portion of the leading frame portion 184. The left-right pair of front support portions 185 and 186 are angled downwardly sideways and angled downwardly rearwardly for supporting a front portion of the engine 18 (see FIG. 1).

The leading frame portion 184 is a portion which is provided with a small section portion 184a, wherein the small section portion 184a is the portion of the leading frame portion 184 having the smallest in sectional area. The small section portion is disposed at a rear part of the front frame portion 181. In FIG. 8A, a straight line passing through the small section portion 184a is denoted by 187. The sectional area of the coupling portion 183 is set to be greater than the sectional area of the small section portion 184a.

The head pipe 148 and the leading frame portion 184, which are integrally formed, are portions constituting a front upper frame portion 188. Lower coupling portions 191, 192 (only symbol 191 on the viewer's side is shown in FIG. 8A) are provided between the front upper frame portion 188 and the left and right front support portions 185 and 186. Engine support holes 193, 193 are provided respectively in tip end portions of the front support portions 185 and 186.

FIG. 8(b) is a view of main frame 180 along arrow b of FIG. 8(a), in which the lower coupling portion 191 is a portion where a left upper coupling portion 191a (projected portion) and a left lower coupling portion 191b (recessed portion) are coupled, and the lower coupling portion 192 is a portion where a right upper coupling portion 192a (projected portion) and a right lower coupling portion 192b (recessed portion) are coupled.

Thus, with the front frame portion 181 provided with the lower coupling portions 191 and 192, the front frame portion 181 can be divided into the front upper frame portion 188 and the front support portions 185 and 186, which are small in size, thereby ensuring easy casting thereof. In addition, at the front support portions 185 and 186, flow of molten metal during casting can be made favorable notwithstanding the slender shape of these members, and casting quality can be enhanced.

Figure 9:
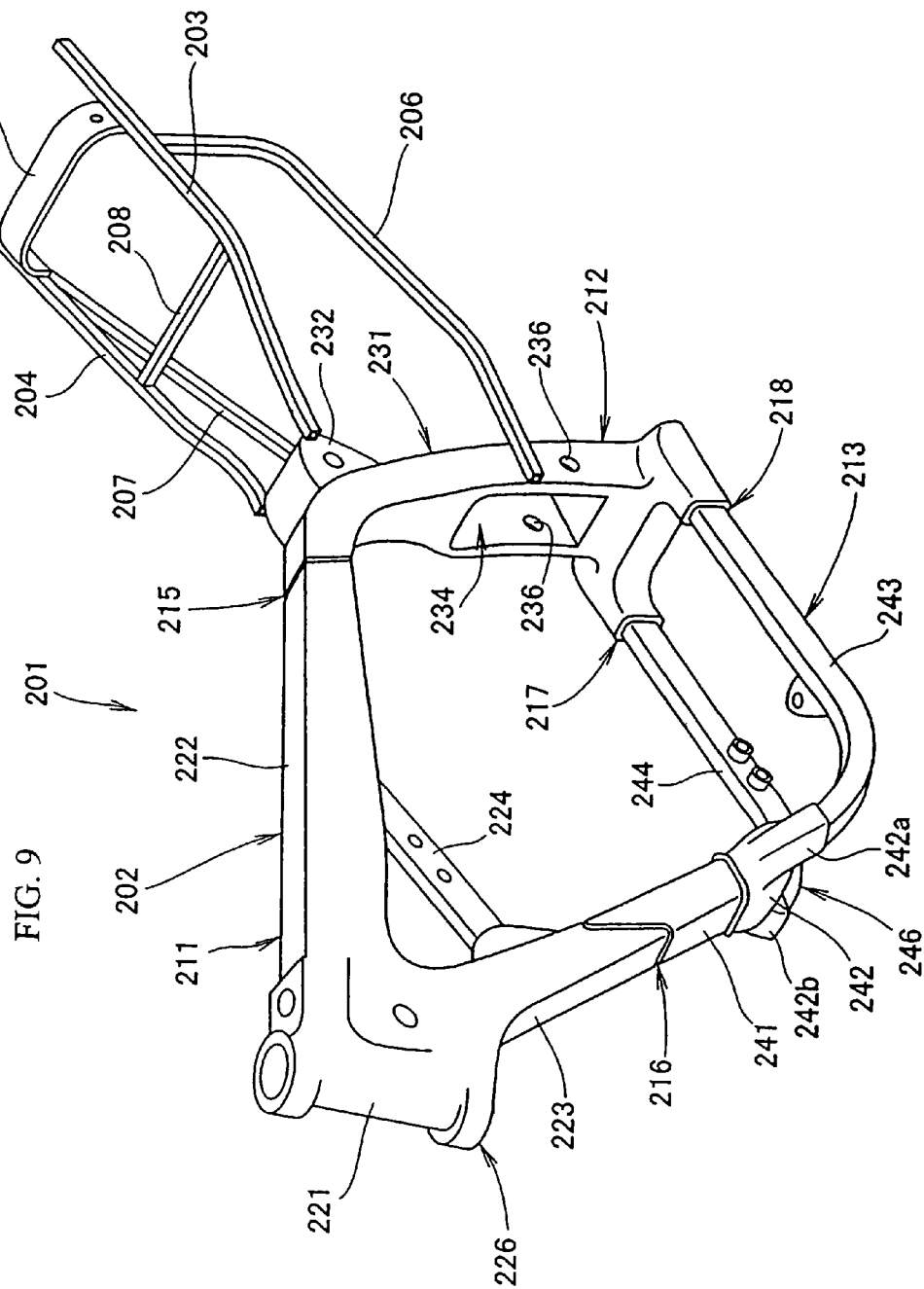
FIG. 9 is a perspective view of a frame assembly according to a fourth embodiment of the present invention, showing a main frame, a rear frame portion, and a bifurcated lower frame.

FIG. 9 is a perspective view of a fourth embodiment frame assembly according to the present invention.

The frame assembly 201 is composed of a main frame 202, a left-right pair of seat rails 203 and 204 mounted to rear upper portions of the main frame 202, and left and right sub-frames 206 and 207 bridgingly mounted between rear lower portions of the main frame 202 and the seat rails 203 and 204, respectively. In addition, cross members 208, 209 are bridgingly disposed between the left and right seat rails 203 and 204.

The main frame 202 is a member cast from an aluminum alloy, and includes a front frame portion 211 provided at a front upper portion, a rear frame portion 212 welded to the rear end of the front frame portion 211, and a lower frame 213 welded to a front lower portion of the front frame portion 211 and a lower portion of the rear frame portion 212. A first coupling portion 215 is provided between the front frame portion 211 and the rear frame portion 212, a second coupling portion 216 is provided between the front frame portion 211 and the lower frame 213, and a third coupling portion 217 and a fourth coupling portion 218 are provided between the rear frame portion 212 and the lower frame 213.

The front frame portion 211 is composed of a head pipe 221, a single leading frame portion 222 which extends rearwardly from the head pipe 221, a down frame 223 which is angled rearwardly downwardly from the head pipe 221, and a reinforcing member 224 which is bridgingly provided between the main frame 222 and the down frame 223. The leading frame portion 222 is a portion composed of a hollow member, of which the sectional area is gradually enlarged from the rear end toward the head pipe 221. Specifically, the sectional shape of the leading frame portion is varied from one portion to another portion along the length of the leading frame portion 222.

The head pipe 221, the main frame 222 and the down frame 223 are configured to form a roughly V-shaped frame 226. Frame 226 is integrally formed to be hollow by placing a core within the mold at the time of casting.

The rear frame portion 212 is composed of a main body portion 231, and a rear projected portion 232 projectedly formed at an upper rear portion of the main body portion 231 for mounting the seat rails 203 and 204. The main body portion 231 is provided at its upper front portion with the first coupling portion 215, and the main body portion 231 is provided at its lower front portions with the third coupling portion 217 and the fourth coupling portion 218. In addition, a cavity portion 234 is provided in the front surface of the main body portion 231, and pivot shaft through-holes 236, penetrating the main body portion 231 from both side surfaces to the cavity portion 234, are provided for mounting the pivot shaft 27 (see FIG. 1).

The lower frame 213 is composed of an extension portion 241 provided on an extension line of the down frame 223, a bifurcated lower connection portion 242 provided at a lower portion of the extension portion 241, and a left frame 243 and a right frame 244 the one-side ends of which are coupled respectively to left and right lower end portions 242a and 242b of the lower connection portion 242 and the other-side ends of which are coupled to the rear frame portion 212. The extension portion 241 and the lower connection portion 242 are members constituting a lower hollow frame 246 integrally formed to be hollow by placing a core at the time of casting.

As shown in FIG. 7 above, the present invention is thirdly characterized in that the frame assembly 139 for the motorcycle 10 (see FIG. 1) includes the head pipe 148 for supporting a front wheel suspension at the front end thereof, the leading frame portion 151 as a single leading frame portion extended rearwardly from the head pipe 148, and the rear frame portion 142 as a rear frame portion for supporting a rear wheel suspension, the rear frame portion 142 extending substantially downwardly from a rear part of the main frame 151. In the invention, the frame assembly 139, specifically, the main frame 140 is cast from an aluminum alloy and is composed of three component parts (i.e., the front half portion 143 constituting the front frame portion 141 on the front side, the rear half portion 144 constituting the front frame portion 141 at an intermediate position, and the rear frame portion 142 on the rear side) in the front-rear direction. The leading frame portion 151 is provided with the small section portion 151a as a portion being the smallest in sectional area at substantially the center in the longitudinal direction thereof, and the component parts 141, 142 are joined on the rear side relative to the small section portion 151a.

The above configuration ensures that, for example, when the two front-side component parts 143, 144 of the three component parts arranged in the front-rear direction of the main frame 140 are distributed on the leading frame portion 151 side whereas the one rear-side component part 142 is distributed on the rear frame portion 142 side, the two front-side component parts 143, 144 and the one rear-side component part 143 can be formed in structures suitable for the respective positions, an error or errors in left-right assembly can be reduced, and the main frame 140 can be formed with good accuracy. In addition, where the three component parts, arranged front-to-rear, are joined by welding, the lengths of welding can be reduced, the welding can be carried out in a short time, and manufacturing productivity can be enhanced.

Furthermore, since the front frame portion 141 and the rear frame portion 142 are coupled on the rear side relative to the small section portion 151a of the main frame 151, it is possible to ensure that stress is not liable to be concentrated on the second coupling portion 146 between the front frame portion 141 and the rear frame portion 142, the sectional area of the second coupling portion 146 can be set smaller, and it is possible to achieve a reduction in the weight of the main frame 140 and, hence, of the frame assembly 139.

The present invention is fourthly characterized in that the single leading frame portion 151 is bisected in the front-rear direction of the vehicle body. This makes it possible to reduce the assembly error or errors on the left and right sides of the main frame 151, to form the leading frame portion 151 with good accuracy, and to produce the respective members of the bisected leading frame portions 151 easily, thereby enhancing manufacturing productivity.

The present invention is fifthly characterized in that the split and welded portions of the main frame 140 are provided respectively at a portion on the front side (i.e., the front half portion 143) and at a portion on the rear side (i.e., the rear half portion 144) relative to the position being smallest in sectional area (i.e., the small section portion 151a) of the main frame 151.

This ensures that an excessively high stress is not generated at the first coupling portion 145 and the second coupling portion 146 because these coupling portions are located to avoid the small section portion 151a being the smallest in sectional area of the main frame 151. Besides, since a large-type hollow casting can be obviated, the hollow casting of the main frame 151 can be easily carried out.

The present invention is sixthly characterized in that, as shown in FIG. 8, the front support portions 185 and 186, disclosed as the engine hanger portions provided in the frame assembly 179 for supporting the engine 18 (see FIG. 1), are structurally separate members from the main frame 181.

Since the front support portions 185 and 186 are structurally separate members from the main frame 181, in the case of gravity casting of the front support portions 185 and 186, flow of molten metal within the mold for the front support portions 185 and 186 can be made favorable, and casting quality can be enhanced.

The present invention is seventhly characterized in that, as shown in FIG. 9, the single leading frame portion 222 is composed of a hollow member of which the sectional shape is varied from one portion to another portion along the length of the leading frame portion 222. This makes it possible to vary the rigidity of the main frame 222 from portion to portion, and to reduce the weight of the main frame 222.

In addition, while the front frame portion 71 and the rear frame portion 23 of the main frame 12 has been coupled by welding as shown in FIG. 2 in this embodiment, this configuration is not limitative of the present invention; for example, the front frame portion 71 and the rear frame portion 23 may be coupled by use of bolt and nut.

The present invention is suitably applicable to a motorcycle including a frame assembly in which a single main frame is used and is cast from an aluminum alloy.

While a working example of the present invention has been described above, the present invention is not limited to the working example described above, but various design alterations may be carried out without departing from the present invention as set forth in the claims.

What is claimed is:

1. A frame assembly for a motorcycle, the frame assembly comprising:
   a head pipe for supporting a front wheel suspension at a front end of the motorcycle,
   a unitary leading frame portion integrally attached to and extending rearwardly from said head pipe, said unitary leading frame portion formed as a closed rectangular tube when viewed in cross-section, and
   a rear frame portion for supporting a rear wheel suspension, said rear frame portion extending substantially downwardly from a rear part of said leading frame portion, the rear frame portion having recessed portions opened in leftward and rightward directions and comprising integrally formed pivot support sleeves projecting in the leftward and rightward directions, such that the rear wheel suspension is supported by the pivot support sleeves; wherein
   the frame assembly comprises a first component part and a second component part, said first and second component parts arranged serially in a front-to-rear direction of the motorcycle, the first and second component parts being cast from an aluminum alloy;
   wherein the first component part comprises the head pipe and the leading frame portion, and the second component part comprises the rear frame portion,
   wherein the leading frame portion comprises a small section portion which provides a part of the leading frame portion having the smallest sectional area, the small section portion disposed medially in the longitudinal direction of the leading frame portion, and
   wherein the first and second component parts are coupled together at a portion of said frame assembly located behind said small section portion,
   wherein a coupling portion is formed between the first component part and the second component part.

2. The frame assembly of claim 1, wherein said first component part is formed as a hollow member by placing a core within a first component part mold at a time of casting the first component part, and
   wherein said second component part is formed by casting in a second component part mold, wherein the second component part mold is a left-right split die configured so that the second component part is formed having integral recessed portions opened in left and right directions, and integral pivot support portions projecting in the left and right directions.

3. The frame assembly of claim 1, further comprising an engine hanger portion provided in said frame assembly for supporting an engine, wherein said engine hanger portion is structurally distinct from said leading frame portion.

4. The frame assembly of claim 1, wherein said unitary leading frame portion comprises a hollow member varied in sectional shape from one portion to another portion along the length of the leading frame portion.

5. The frame assembly of claim 1, wherein the first component part is joined to said second component part at the coupling portion, wherein the coupling portion comprises:
a recess formed in an end portion of one of the first component part and the second component part, and
a projection formed in an end portion of the other of the first component part and the second component part,
and wherein said projection is received within said recess.

6. A frame assembly for a motorcycle, the frame assembly comprising:
a head pipe for supporting a front wheel suspension at a front end of the motorcycle,
a unitary leading frame portion attached to and extending rearwardly from said head pipe, and
a rear frame portion for supporting a rear wheel suspension, said rear frame portion extending downwardly from a rear part of said leading frame portion, wherein
the frame assembly comprises a first component part and a second component part, said first and second component parts arranged serially in a front-to-rear direction of the motorcycle, the first and second component parts being cast from an aluminum alloy;
wherein the first component part comprises the head pipe and the leading frame portion, and the second component part comprises the rear frame portion,
wherein the leading frame portion comprises a small section portion which provides a part of the leading frame portion having the smallest sectional area, the small section portion disposed medially in the longitudinal direction of the leading frame portion, and
wherein the first and second component parts are coupled together at a portion of said frame assembly located behind said small section portion, wherein the first component part is joined to said second component part at a coupling portion, and the cross sectional area of the coupling portion is greater than the cross sectional area of the small section portion.

7. A frame assembly for a motorcycle, the frame assembly comprising:
a head pipe for supporting a front wheel suspension at a front end of the frame assembly,
a unitary leading frame portion integrally attached to and extending rearwardly from said head pipe, said unitary leading frame portion formed as a closed rectangular tube when viewed in cross-section, and
a rear frame portion for supporting a rear wheel suspension, said rear frame portion extending substantially downwardly from a rear part of said leading frame portion, the rear frame portion having recessed portions opened in leftward and rightward directions and comprising integrally formed pivot support sleeves projecting in the leftward and rightward directions, such that the rear wheel suspension is supported by the pivot support sleeves; wherein
said frame assembly is cast from an aluminum alloy and comprises three component parts arranged serially in the front-rear direction of the motorcycle; and
said leading frame portion comprises a small section portion which provides a part of the leading frame portion having the smallest sectional area, the small section portion disposed at a medial part, in the longitudinal direction, of the leading frame portion, and the two rear-side component parts of said three component parts are coupled on the rear side relative to said small section portion,
wherein a coupling portion is formed between the three component parts.

8. The frame assembly of claim 7, wherein said unitary leading frame portion is bisected in the front-rear direction of the motorcycle body.

9. The frame assembly of claim 7, wherein a first welded portion joins a first component part of said three component parts to a second component part of said three component parts, and wherein a second welded portion joins said second component part to a third component part of said three component parts, and
wherein said first welded portion is provided at a portion on the front side relative to said small section portion, and wherein said second welded portion is provided at a portion on the rear side relative to said small section portion.

10. The frame assembly of claim 9, wherein the first welded portion has a cross sectional area that is greater in area than the cross sectional area of the second welded portion.

11. The frame assembly of claim 7, wherein an engine hanger portion provided in said frame assembly for supporting an engine is structurally distinct from said leading frame portion.

12. The frame assembly of claim 7, wherein said unitary leading frame portion comprises a hollow member varied in sectional shape from one portion to another portion along the length of the leading frame portion.

13. A frame assembly for a motorcycle, the frame assembly comprising:
a head pipe for supporting a front wheel suspension at a front end thereof,
a unitary leading frame portion extending rearwardly from said head pipe, said unitary leading frame portion formed as a closed rectangular tube when viewed in cross-section, and
a rear frame portion for supporting a rear wheel suspension, said rear frame portion extending substantially downwardly from a rear part of said leading frame portion, the rear frame portion having recessed portions opened in leftward and rightward directions and comprising integrally formed pivot support sleeves projecting in the leftward and rightward directions, such that the rear wheel suspension is supported by the pivot support sleeves;
wherein said frame assembly is cast from an aluminum alloy, and comprises two component parts joined serially in a front-to-rear direction of the motorcycle,
wherein a coupling portion is formed between a first component part and a second component part.

14. The frame assembly of claim 13, wherein said leading frame portion comprises a small section portion which provides a part of the leading frame portion having the smallest sectional area, the small section portion disposed medially in the longitudinal direction of the leading frame portion, and
said two component parts are coupled together at an area of said frame assembly behind said small section portion.

15. The frame assembly of claim 14, wherein a first component part of said two component parts is joined to a second component part of said two component parts at the coupling portion, and the cross sectional area of the coupling portion is greater than the cross sectional area of the small section portion.

16. The frame assembly of claim 13, wherein a front frame portion, constituting a front portion of said frame assembly, is formed to be hollow by placing a core within a front frame portion mold at a time of casting the front frame portion, and a rear frame portion, constituting a rear part of said frame assembly, is formed by casting within a left-right split die configured so that the rear frame portion is formed having integral recessed portions opened in the left and right directions and integral pivot support portions projecting in left and right directions.

17. A frame assembly for a motorcycle, the frame assembly comprising:

a head pipe for supporting a front wheel suspension at a front end of the frame assembly, a unitary leading frame portion attached to and extending rearwardly from said head pipe, and a rear frame portion for supporting a rear wheel suspension, said rear frame portion extending substantially downwardly from a rear part of said leading frame portion, wherein said frame assembly is cast from an aluminum alloy and comprises three component parts arranged serially in the front-rear direction of the motorcycle; and said leading frame portion comprises a small section portion which provides a part of the leading frame portion having the smallest sectional area, the small section portion disposed at a medial part, in the longitudinal direction, of the leading frame portion, and the two rear-side component parts of said three component parts are coupled on the rear side relative to said small section portion, wherein said unitary leading frame portion is bisected in the front-rear direction of the motorcycle body.

* * * * *